(12) United States Patent
Kim et al.

(10) Patent No.: US 12,485,802 B2
(45) Date of Patent: Dec. 2, 2025

(54) RECLINER FOR VEHICLE SEAT

(71) Applicant: Hyundai Transys Inc., Seosan-si (KR)

(72) Inventors: Sungchul Kim, Hwaseong-si (KR); Donghyeon Son, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 300 days.

(21) Appl. No.: 18/335,560

(22) Filed: Jun. 15, 2023

(65) Prior Publication Data

US 2024/0051436 A1 Feb. 15, 2024

(30) Foreign Application Priority Data

Aug. 9, 2022 (KR) .......................... 10-2022-0099361

(51) Int. Cl.
*B60N 2/22* (2006.01)

(52) U.S. Cl.
CPC .................................. *B60N 2/2213* (2013.01)

(58) Field of Classification Search
CPC ........ B60N 2/2213; B60N 2/225; A47C 1/025
USPC ........................................................ 297/362
See application file for complete search history.

(56) References Cited

U.S. PATENT DOCUMENTS

| | | | | |
|---|---|---|---|---|
| 4,020,717 A * | 5/1977 | Johnson | ............... | B60N 2/2252 475/349 |
| 6,880,887 B2 * | 4/2005 | Hoshihara | ............. | B60N 2/236 297/367 R |
| 7,753,450 B2 * | 7/2010 | Eppert | ................. | B60N 2/2254 297/361.1 |
| 8,444,521 B2 * | 5/2013 | Krueger | ............... | B60N 2/2252 475/162 |
| 8,915,548 B2 * | 12/2014 | Stilleke | ............... | B60N 2/2252 297/361.1 |
| 8,931,842 B2 * | 1/2015 | Hiemstra | ............... | B21D 53/28 297/362 |
| 8,950,811 B2 * | 2/2015 | Narita | .................. | B60N 2/2254 297/362.11 |
| 9,033,418 B2 * | 5/2015 | Jokiel | .................. | E04H 15/642 297/362 |

(Continued)

FOREIGN PATENT DOCUMENTS

| | | |
|---|---|---|
| FR | 3095171 A1 | 10/2020 |
| JP | 2008-006265 A | 1/2008 |

(Continued)

OTHER PUBLICATIONS

Klaus-Dieter Lotz, "European Search Report for EP Application No. 23179988.3", Jan. 8, 2024, EPO, Germany.

*Primary Examiner* — Jose V Chen
(74) *Attorney, Agent, or Firm* — Bridgeway IP Law Group, PLLC; Jihun Kim

(57) ABSTRACT

A recliner for a vehicle seat includes a first gear having a collar part at a center thereof, a second gear being internally in contact with the first gear and configured to eccentrically engage with the first gear, a socket including a first coupling portion having an outer diameter portion coupled to be in contact with an inner diameter portion of the collar part, and a second coupling portion having an inner diameter portion coupled to surround an outer diameter portion of the collar part while being in contact with the outer diameter portion of the collar part, and a pair of wedge cams disposed between the socket and the second gear and configured to restrain or release the socket and the second gear.

11 Claims, 10 Drawing Sheets

(56) References Cited

U.S. PATENT DOCUMENTS

| | | | |
|---|---|---|---|
| 11,407,337 B2 | 8/2022 | Lee | |
| 11,701,987 B2* | 7/2023 | Scholz | B60N 2/2251 |
| | | | 297/362 |
| 12,319,177 B2* | 6/2025 | Kim | B60N 2/224 |
| 2008/0136242 A1* | 6/2008 | Stemmer | B60N 2/2254 |
| | | | 297/362 |
| 2014/0001806 A1* | 1/2014 | Golarz | B60N 2/2252 |
| | | | 297/362 |
| 2014/0239694 A1* | 8/2014 | Jiang | B60N 2/2252 |
| | | | 297/362 |
| 2015/0054324 A1* | 2/2015 | Chang | B60N 2/2254 |
| | | | 297/362 |
| 2015/0298583 A1* | 10/2015 | Kim | B60N 2/2252 |
| | | | 297/362 |
| 2016/0059743 A1* | 3/2016 | Tsuji | B60N 2/2252 |
| | | | 297/362 |
| 2021/0162892 A1* | 6/2021 | Lee | B60N 2/02246 |
| 2022/0133042 A1* | 5/2022 | Oishi | B60N 2/2356 |
| | | | 297/362 |
| 2023/0082477 A1* | 3/2023 | Kim | B60N 2/2254 |
| | | | 297/362 |
| 2024/0034203 A1* | 2/2024 | Shin | B60N 2/2252 |
| 2024/0317119 A1* | 9/2024 | Oishi | B60N 2/2213 |

FOREIGN PATENT DOCUMENTS

| | | |
|---|---|---|
| JP | 2019-090460 A | 6/2019 |
| KR | 2015-0096930 A | 8/2015 |
| KR | 102236705 B1 | 4/2021 |

* cited by examiner

RECLINER FOR VEHICLE SEAT

CROSS-REFERENCE TO RELATED APPLICATIONS

This application claims priority to and the benefit of Korean Patent Application No. 10-2022-0099361 filed in the Korean Intellectual Property Office on Aug. 9, 2022, the entire contents of which are incorporated herein by reference.

TECHNICAL FIELD

The present invention relates to a recliner for a vehicle seat.

BACKGROUND ART

In general, a recliner may adjust an angle of a seatback in a forward/rearward direction with respect to a seat cushion and provide a high coupling force between components during a reclining operation, thereby ensuring safety of a vehicle occupant. The recliners may be classified into a manual recliner that adjusts an angle of a seatback in response to a lever manipulation, and a powered recliner that may be automatically operated by power of a motor generated in response to a switch manipulation.

FIG. 1 is a view illustrating a state in which a recliner for a vehicle seat in the related art is mounted on a seatback frame, FIG. 2 is an exploded perspective view of the recliner for a vehicle seat in the related art, FIG. 3 is a cross-sectional side view of the recliner for a vehicle seat in the related art, FIG. 4 is a view illustrating a collar part of the recliner for a vehicle seat in the related art, and FIG. 5 is a top plan view illustrating a state in which a wedge cam of the recliner for a vehicle seat in the related art is coupled to the collar part.

As illustrated in FIG. 1, a recliner 100 may be mounted on a seatback frame SF in a seatback SB. As illustrated in FIGS. 2 and 4, the recliner 100 in the related art includes a first gear 101 having inner teeth 101a, and a second gear 102 having outer teeth 102a that engage with the inner teeth 101a of the first gear 101. The second gear 102 is eccentrically coupled in the first gear 101. A bushing 108 is assembled to an inner diameter portion of the second gear 102. A socket 105 is coupled to a collar part 101b of the first gear 101. A pair of wedge cams 103 is coupled to an outer portion of the collar part 101b. The eccentric states of the first gear 101 and the second gear 102 may be maintained by the pair of wedge cams 103, and a locked state or an unlocked state for the operation of the recliner may be maintained. The pair of wedge cams 103 is elastically supported by two opposite bent ends 109a of the spring 109, and a spread state thereof may be maintained. When a motor M is operated by an operation of a switch SW and a shaft 104 connected to the motor M rotates, the first gear 101 is rotated by a rotation of the socket 105 connected to the shaft 104 and rotations of the wedge cams 103. Therefore, an angle of a seatback frame SF may be adjusted, and an angle of the seatback SB may be adjusted. A cover 106 may be coupled to an inner diameter portion of the second gear 102 so as to surround the spring 109. A guide ring 107 may be coupled to surround an engagement portion where the inner teeth 101a of the first gear 101 and the outer teeth 102a of the second gear 102 engage with one another.

Meanwhile, when an external force is applied to the seatback frame SF, a load L, which is transmitted through an engagement portion between the inner teeth 101a of the first gear 101 and the outer teeth 102a of the second gear 102, is concentrated on the collar part 101b of the first gear 101, which causes deformation of the collar part 101b. The deformation of the collar part 101b may cause a deterioration in engagement properties between the second gear 102 and the first gear 101 and cause damage.

In the related art, a thickness of the collar part 101b of the first gear 101 is increased to solve the above-mentioned problem, but there is a limitation in increasing the thickness of the collar part. The collar part 101b, which is produced by a burring or forming process, has a non-uniform surface roughness SU, and scratches SC are inevitably formed in an axial direction of an outer diameter portion. For this reason, friction of the wedge cams 103, which are in contact with the collar part 101b and rotate, is increased, which adversely affects the operation of the recliner.

In addition, as illustrated in FIG. 5, to compensate for a dimension tolerance condition of each of the components, a gap G is essentially required to be present in a contact portion between the wedge cam 103 and the socket 105. However, a time difference occurs as a wedge 10 does not immediately rotate because of the gap G when the socket 105 operates, which causes a problem of deteriorating responsiveness of the seatback SB.

DOCUMENT OF RELATED ART

Patent Document (Patent Document 1) Korean Patent No. 10-2236705 (published on Apr. 6, 2021)

SUMMARY OF THE INVENTION

The present invention has been made in an effort to provide a recliner for a vehicle seat, in which first and second coupling portions, which are simultaneously coupled to inner and outer diameter portions of a collar part, are provided on a socket so that a load, which is transmitted from a wedge cam, may be dispersed by the first and second coupling portions.

Another object of the present invention is to provide a recliner for a vehicle seat, in which a contact portion of a socket, which comes into contact with a wedge cam, may be polished to minimize friction of the wedge cam, and the wedge cam may come into contact with and be coupled to a second coupling portion of the socket such that a motion of the wedge cam may be performed at the same time when a shaft is rotated by an operation of a motor.

To achieve the above-mentioned objects, the present invention provides a recliner for a vehicle seat, the recliner including: a first gear having a collar part at a center thereof; a second gear being internally in contact with the first gear and configured to eccentrically engage with the first gear; a socket including a first coupling portion having an outer diameter portion inserted into and coupled to an inner diameter portion of the collar part, and a second coupling portion having an inner diameter portion coupled to surround an outer diameter portion of the collar part while being in contact with the outer diameter portion of the collar part; and a pair of wedge cams disposed between the socket and the second gear and configured to restrain or release the socket and the second gear.

In addition, the second coupling portion may be formed to have a larger circular shape than the first coupling portion.

In addition, the first coupling portion may have a longer length than the second coupling portion.

In addition, an end of the second coupling portion may be directed toward the first gear.

In addition, an accommodation groove may be formed between the first coupling portion and the second coupling portion as the first coupling portion and the second coupling portion are formed, and the collar part may be inserted into the accommodation groove.

In addition, the wedge cam may be in contact with and coupled to an outer diameter portion of the second coupling portion.

In addition, the socket may be formed by sintering.

In addition, the entirety of the socket or a contact portion of the socket, which comes into contact with the wedge cam, may be at least polished.

In addition, the socket may include: a wing portion formed on an outer diameter portion of the second coupling portion and spaced apart from an end of the second coupling portion at an interval; a push portion extending in a direction from one surface of the wing portion to the end of the second coupling portion; and an assembling portion protruding from the other surface of the wing portion.

In addition, the wing portion may have a coupling groove, an elastic member may be coupled to the assembling portion, and two opposite ends of the elastic member may be coupled to insertion grooves provided at ends of the pair of wedge cams, which face each other, through the coupling groove.

In addition, the push portion may have an arc shape, and the wedge cam may be rotated by being pushed by the push portion.

In addition, the socket may have an inner diameter portion penetrating a center thereof, and the inner diameter portion may have an angular structure to which a shaft is capable of being coupled.

According to the present invention, a load transmitted from the wedge cam may be dispersed by the first and second coupling portions.

In addition, according to the present invention, the first coupling portion may serve to define an auxiliary support structure and come into contact with the collar part when the deformation occurs.

In addition, according to the present invention, the contact portion of the socket, which comes into contact with the wedge cam, may be polished, thereby minimizing friction of the wedge cam.

In addition, the wedge cam may come into contact with and be coupled to the second coupling portion of the socket such that the motion of the wedge cam may be performed at the same time when the shaft is rotated by the operation of the motor.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
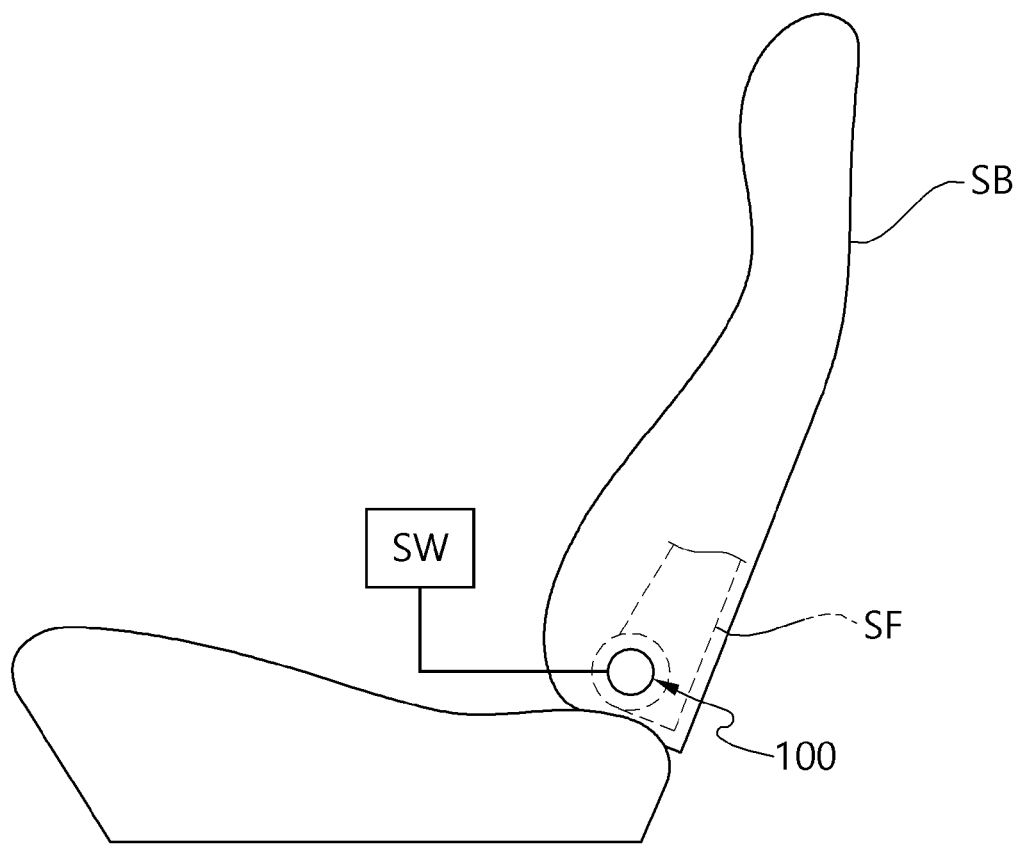
FIG. 1 is a view illustrating a state in which a recliner for a vehicle seat in the related art is mounted on a seatback frame.
Figure 2:
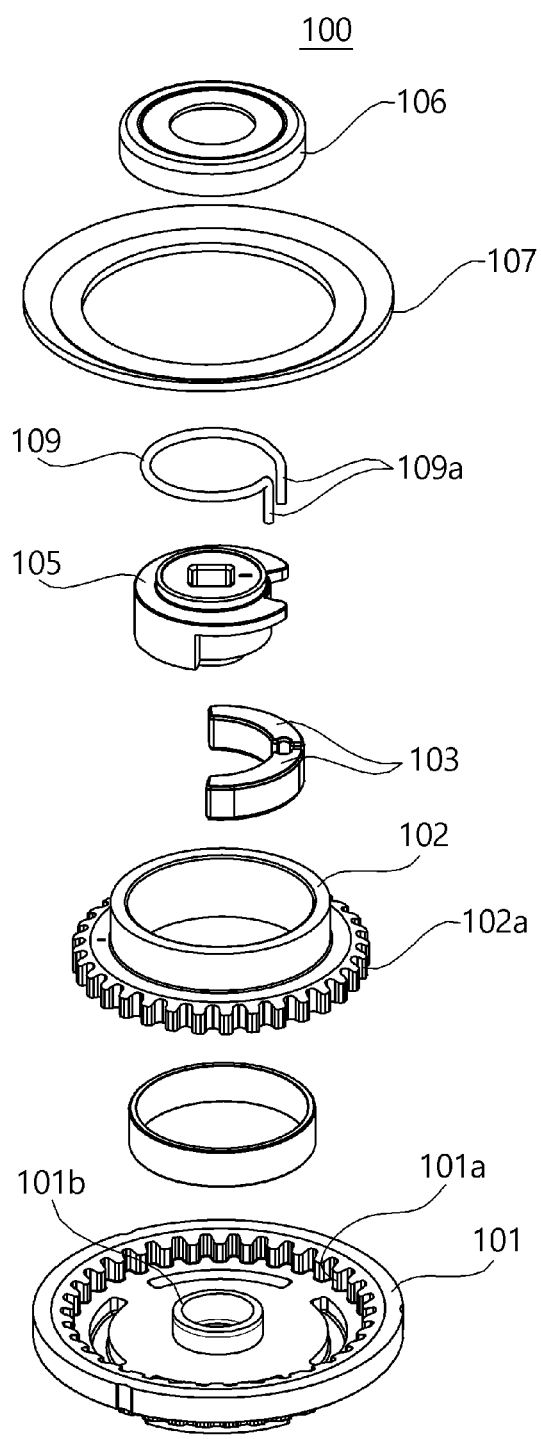
FIG. 2 is an exploded perspective view of the recliner for a vehicle seat in the related art.
Figure 3:
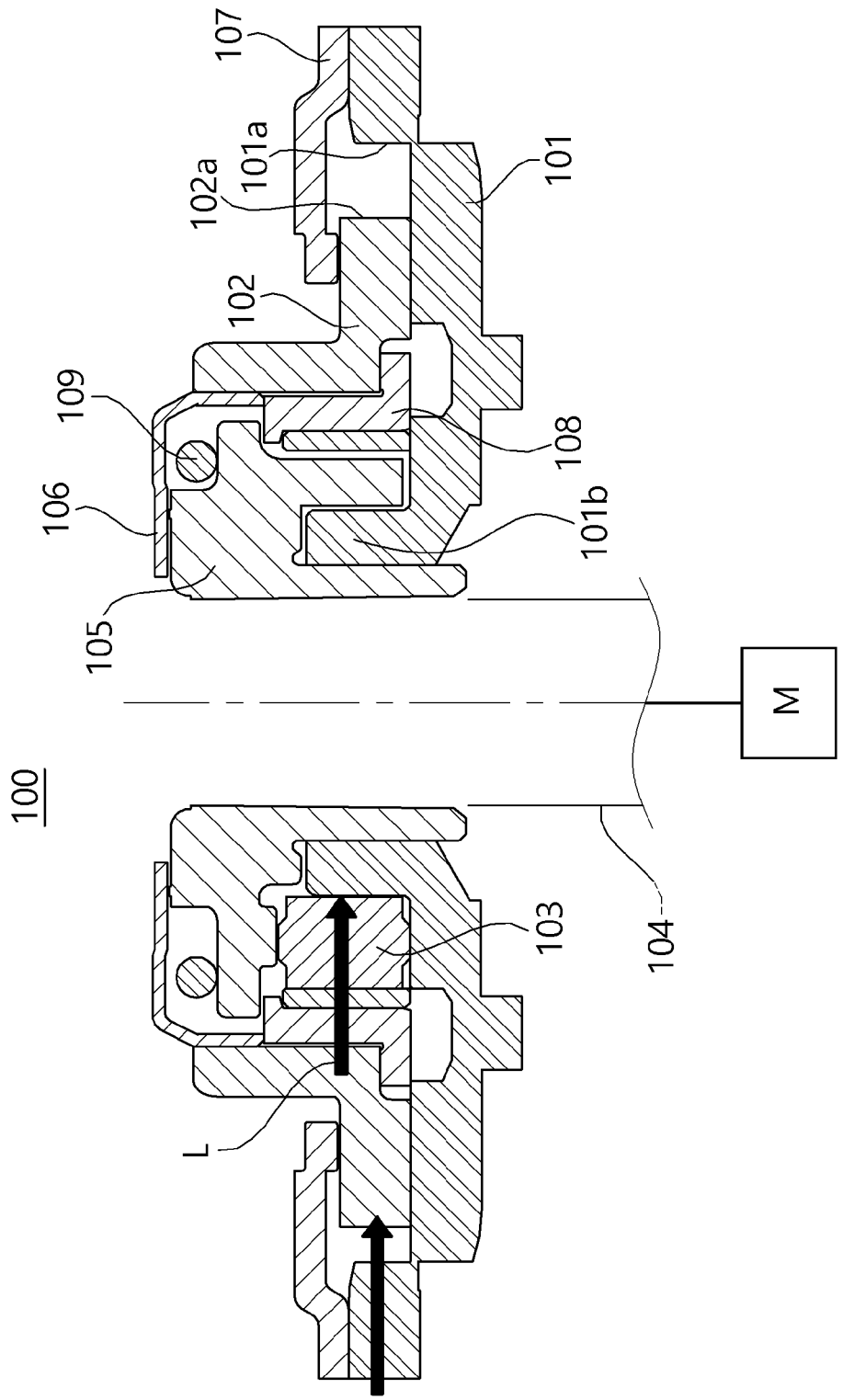
FIG. 3 is a cross-sectional side view of the recliner for a vehicle seat in the related art.
Figure 4:
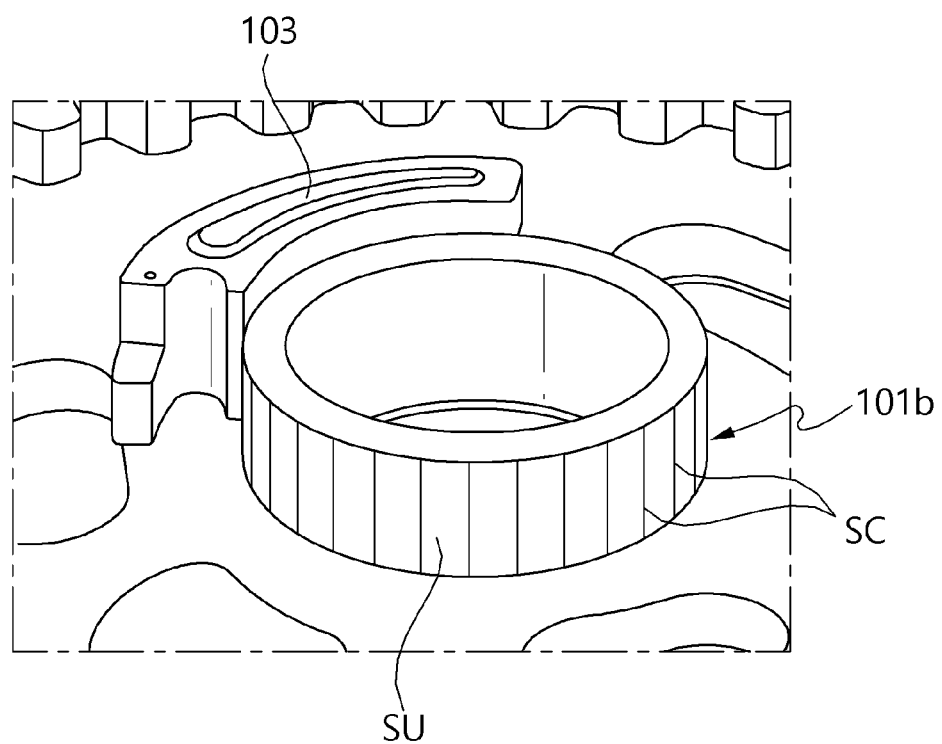
FIG. 4 is a view illustrating a collar part of the recliner for a vehicle seat in the related art.
Figure 5:
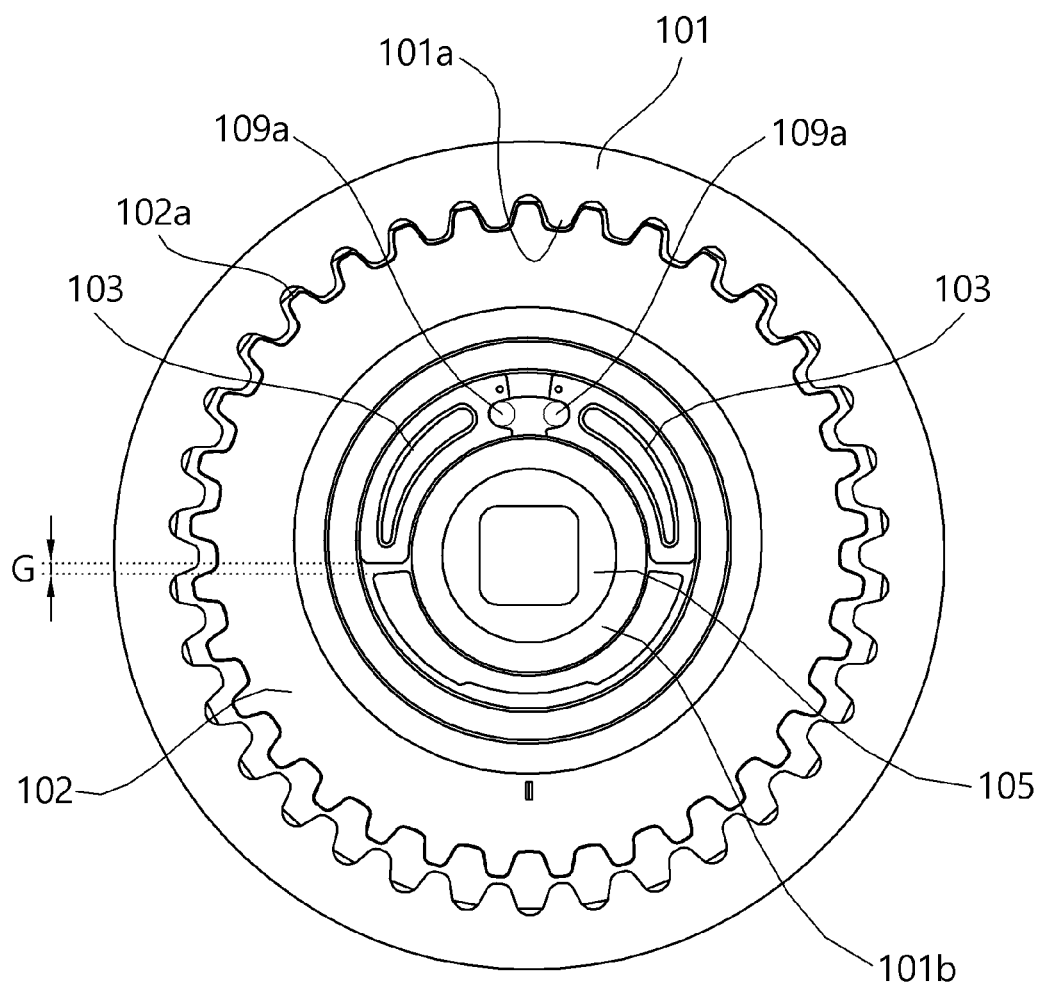
FIG. 5 is a top plan view illustrating a state in which a wedge cam of the recliner for a vehicle seat in the related art is coupled to the collar part.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 6:
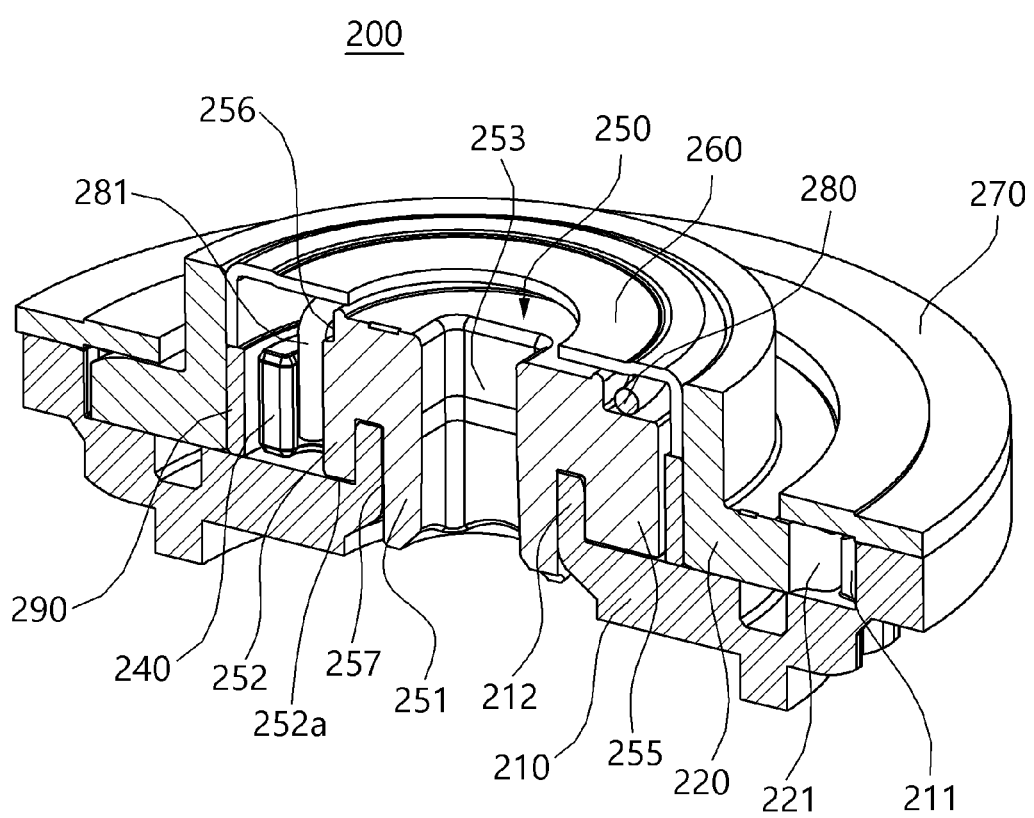
FIG. 6 is a perspective view of a recliner for a vehicle seat according to an exemplary embodiment of the present invention.

FIG. 6 is a perspective view of a recliner for a vehicle seat according to an exemplary embodiment of the present invention.

As illustrated in FIG. 6, a recliner 200 for a vehicle seat of the present invention includes a first gear 210 having a collar part 212 at a center thereof, a second gear 220 being internally in contact with the first gear 210, a socket 250 having first and second coupling portions 251 and 252 coupled to surround inner and outer diameter portions of the collar part 212, and a pair of wedge cams 240 coupled between the socket 250 and the second gear 220.

A coupling member 290 may be coupled to an inner diameter portion of the second gear 220. The coupling member 290 may be positioned between the inner diameter portion of the second gear 220 and the wedge cam 240. For example, the coupling member 290 may be a bushing, a bearing, or the like.

Two opposite ends 281 of an elastic member 280, which are bent and extend, push ends of the pair of two opposite wedge cams 240, which face each other, in a direction in which the ends of the pair of two opposite wedge cams 240 move away from each other. The elastic member 280 may be coupled to the socket 250. The elastic member 280 may be positioned between a first cover 260 and the socket 250.

Figure 7:
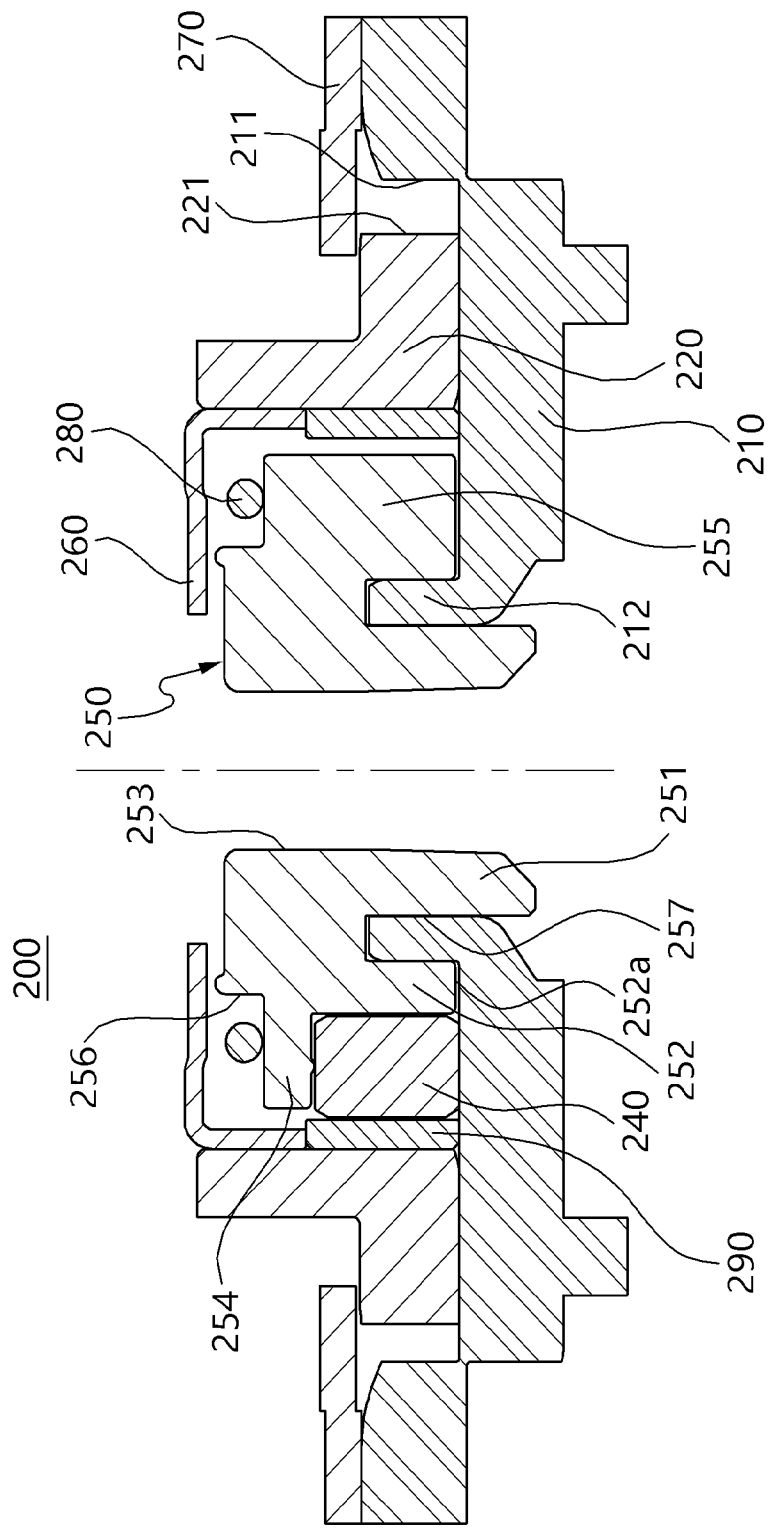
FIG. 7 is a cross-sectional side view of the recliner for a vehicle seat according to the exemplary embodiment of the present invention.
Figure 8:
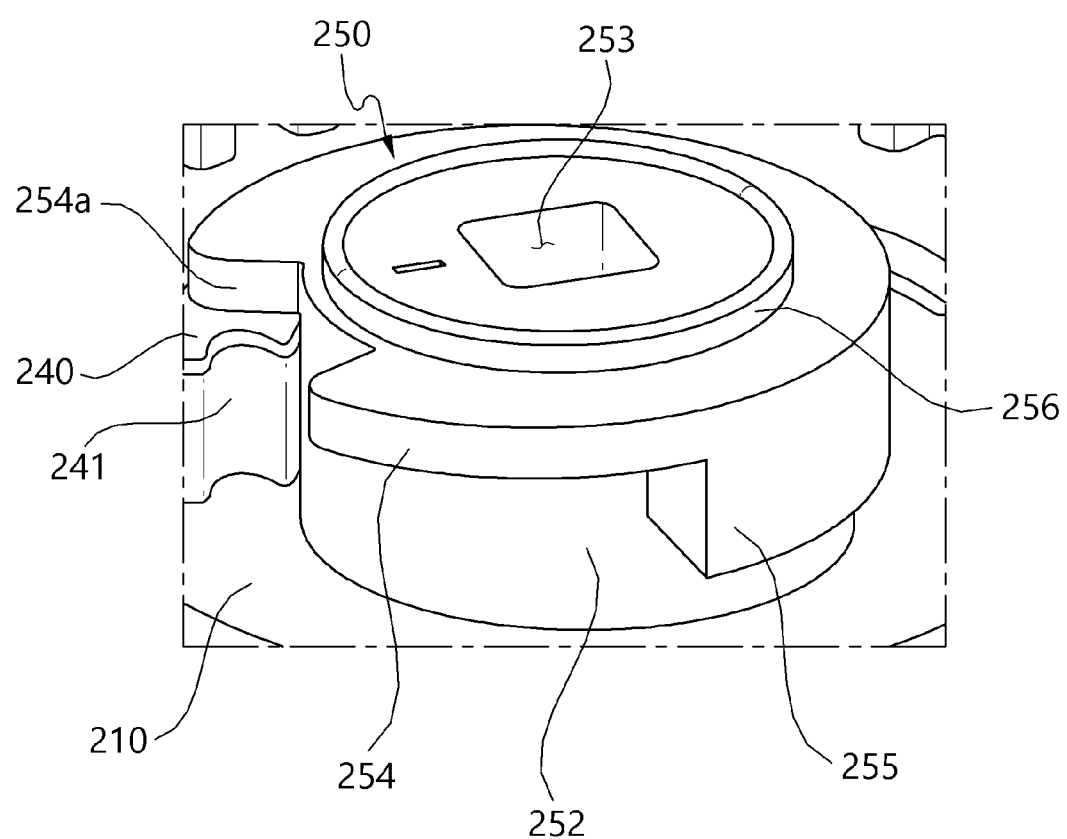
FIG. 8 is an enlarged view of a socket according to the exemplary embodiment of the present invention.
Figure 9:
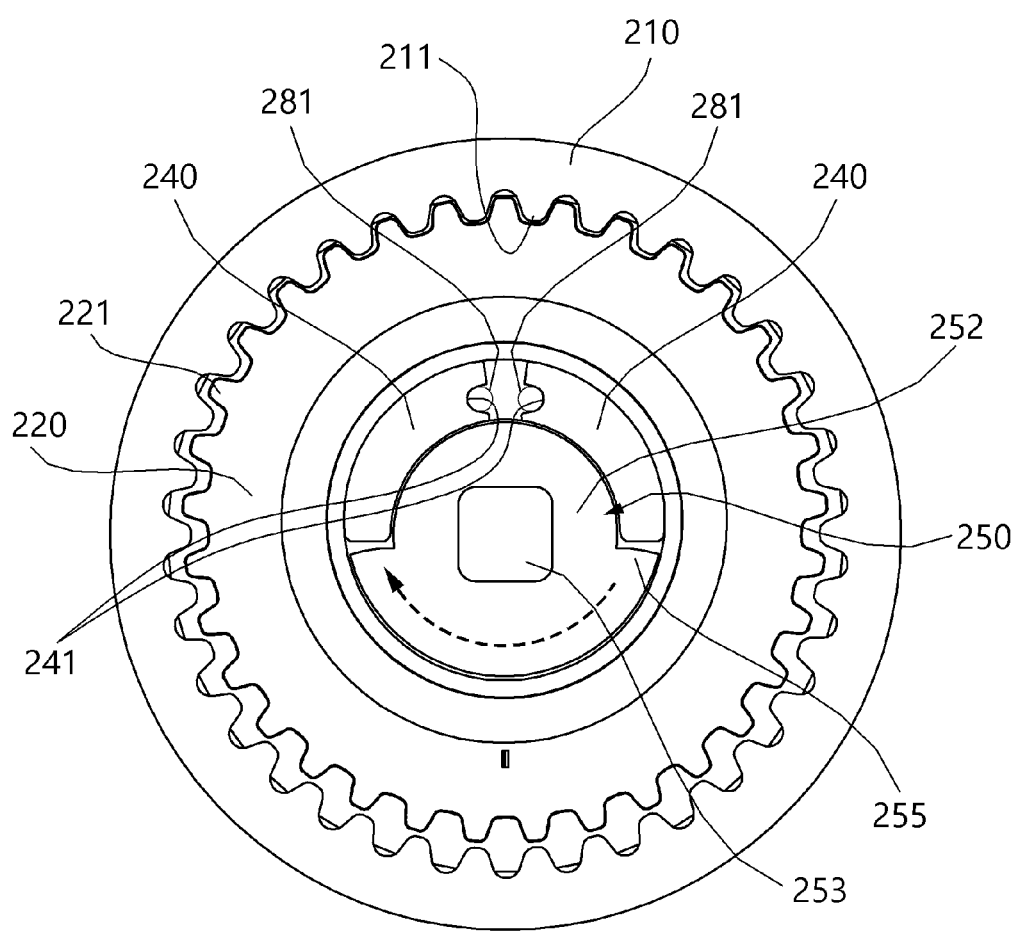
FIG. 9 is a top plan view illustrating a state in which a wedge cam of the recliner for a vehicle seat according to the exemplary embodiment of the present invention is coupled to the socket.

FIG. 7 is a cross-sectional side view of the recliner for a vehicle seat according to the exemplary embodiment of the present invention, FIG. 8 is an enlarged view of a socket according to the exemplary embodiment of the present invention, and FIG. 9 is a top plan view illustrating a state in which a wedge cam of the recliner for a vehicle seat according to the exemplary embodiment of the present invention is coupled to the socket.

As illustrated in FIGS. 7 to 9, the first gear 210 may have inner teeth 211 provided on an inner diameter portion thereof.

The second gear 220 may have a smaller outer diameter than the first gear 210. The second gear 220 may eccentrically engage with the first gear 210. The second gear 220 has outer teeth 221 provided on an outer diameter portion thereof. The outer teeth 221 of the second gear 220 may engage with the inner teeth 211 of the first gear 210.

The wedge cam 240 may have an arc shape. The wedge cam 240 may have a width that gradually increases toward one end thereof. The pair of wedge cams 240 may restrain or release the socket 250 and the second gear 220.

The wedge cam 240 may rotate when the socket 250 rotates. An inner diameter portion 253 of the socket 250 may have an angular structure such as a quadrangular structure. A shaft (not illustrated) for transmitting power may be coupled to the inner diameter portion 253 of the socket 250. The shaft may be connected to a motor (not illustrated).

The socket 250 includes a first coupling portion 251, a second coupling portion 252, and an accommodation groove 257 formed between the first coupling portion 251 and the second coupling portion 252.

The wedge cam 240 may be in contact with and coupled to an outer diameter portion of the second coupling portion 252 through one or more lines or surfaces. In addition, the wedge cam 240 may move without a time difference when the socket 250 rotates, such that responsiveness of the seatback may be improved.

The first coupling portion 251 of the socket 250 extends in a direction of the collar part 212 of the first gear 210. The first coupling portion 251 is inserted into and coupled to the inner diameter portion of the collar part 212.

Because the first coupling portion 251 is coupled to the inner diameter portion of the collar part 212, the first coupling portion 251 may have a longer length than the second coupling portion 252.

A gap is formed between an outer diameter portion of the first coupling portion 251 and the inner diameter portion of the collar part 212, such that the collar part 212 may rotate.

When the deformation occurs by an external force, the outer diameter portion of the first coupling portion 251 may come into contact with the inner diameter portion of the collar part 212.

The second coupling portion 252 is configured to have a larger circular shape than the first coupling portion 251 in order to surround the outer diameter portion of the collar part 212. An end 252a of the second coupling portion 252 is directed toward the first gear 210. When the second coupling portion 252 is coupled, an inner diameter portion of the second coupling portion 252 comes into contact with the outer diameter portion of the collar part 212.

As the first coupling portion 251 and the second coupling portion 252 are formed, the accommodation groove 257 may be formed between the first coupling portion 251 and the second coupling portion 252. The accommodation groove 257 is formed in a shape that conforms to the collar part 212. The collar part 212 may be inserted into the accommodation groove 257.

With the coupling structure in which the first coupling portion 251 surrounds the inner diameter portion of the collar part 212 and the second coupling portion 252 surrounds the outer diameter portion of the collar part 212, it is possible to disperse a load transmitted from the wedge cam 240 and thus minimize a load to be applied to the collar part 212.

The socket 250 includes the inner diameter portion 253, a wing portion 254, a push portion 255 extending from one surface of the wing portion 254, and an assembling portion 256 protruding from the other surface of the wing portion 254.

The inner diameter portion 253 is structured to penetrate a center of the socket 250.

The wing portion 254 is formed on the outer diameter portion of the second coupling portion 252 and spaced apart from the end 252a of the second coupling portion 252 at an interval.

For example, the wing portion 254 may be formed circularly. The wing portion 254 has a coupling groove 254a. The wing portion 254 is coupled to surround the wedge cams 240 during the assembling process.

As the second coupling portion 252 and the wing portion 254 are formed, an assembling space for the wedge cam 240 may be formed between the second coupling portion 252 and the wing portion 254.

The push portion 255 extends in a direction from one surface of the wing portion 254 to the end 252a of the second coupling portion 252. The push portion 255 may have an arc shape. When the socket 250 rotates, the wedge cams 240 may be rotated by being pushed by the push portion 255 (see FIG. 9).

The elastic member 280 may be coupled to the assembling portion 256, such that the two opposite bent ends 281 may be coupled to insertion grooves 241 provided at the ends of the pair of wedge cams 240, which face each other, through the coupling groove 254a. For example, the elastic member 280 may be a spring.

The first cover 260 may be coupled to the inner diameter portion of the second gear 220. The first cover 260 may prevent the separation of the wedge cams 240, the socket 250, the elastic member 280, and the like that are coupled in the second gear 220. For example, the first cover 260 may be coupled to the inner diameter portion of the second gear 220 by welding.

A second cover 270 may be coupled to an outer diameter portion of the first gear 210. The second cover 270 may be coupled to surround an engagement portion between the inner teeth 211 of the first gear 210 and the outer teeth 221 of the second gear 220, thereby preventing the second gear 220 from separating from the first gear 210.

As illustrated in FIG. 8, the socket 250 may be formed by sintering.

The entirety of the socket 250, which is formed by sintering, or the contact portion of the socket 250, which comes into contact with the wedge cams 240, may be polished. For example, at least the second coupling portion 252 of the socket 250 may be polished.

The polishing may remove scratches on the socket 250 and optimize surface roughness. Therefore, the friction of the wedge cam 240, which is in contact with the socket 250, may be minimized, thereby allowing the wedge cam 240 to operate smoothly.

Next, a load applied to the collar part of the present invention will be described.

Figure 10:
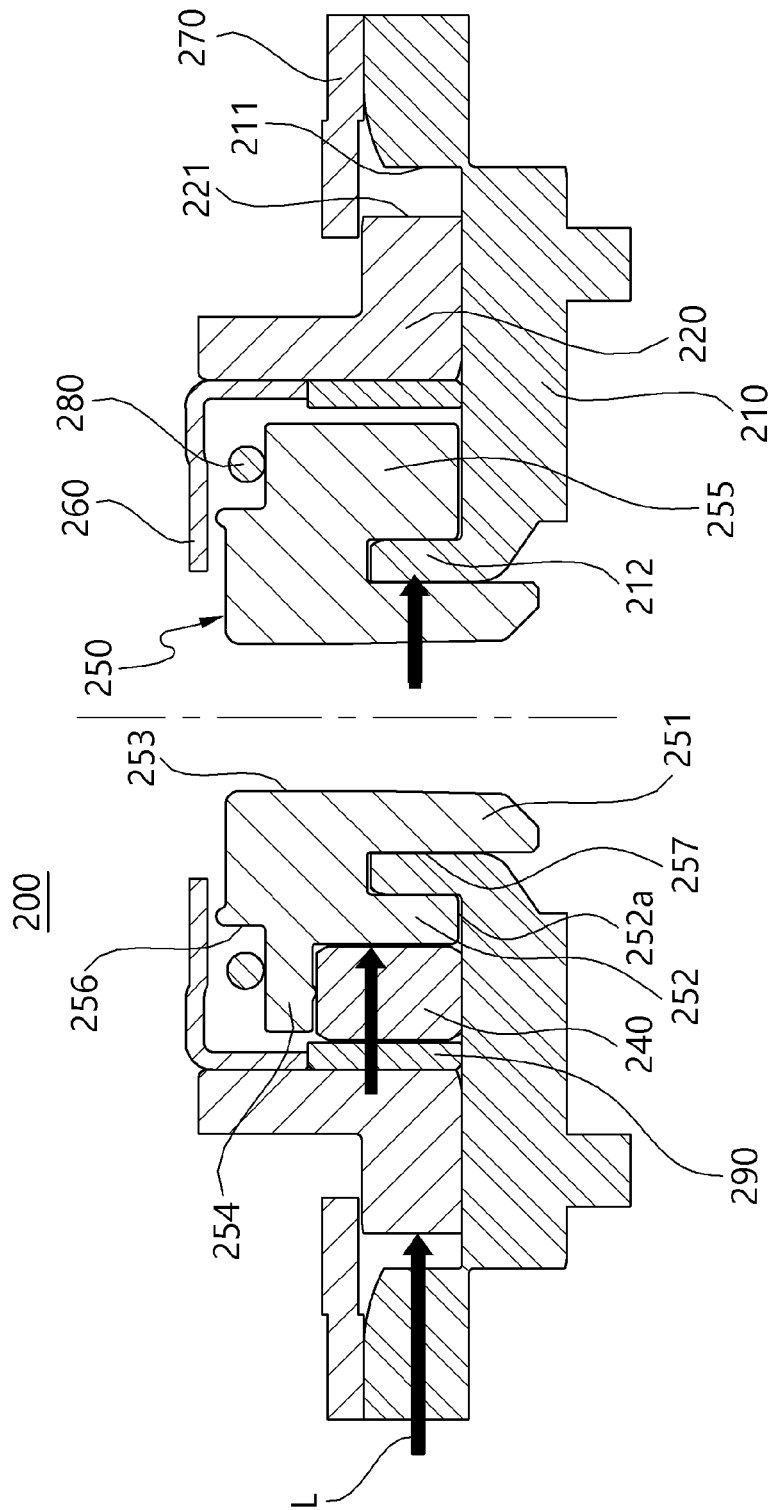
FIG. 10 is a view illustrating a load applied to the collar part of the recliner for a vehicle seat according to the exemplary embodiment of the present invention.

FIG. 10 is a view illustrating a load applied to the collar part of the recliner for a vehicle seat according to the exemplary embodiment of the present invention.

In the related art, when an external force is applied to a seatback frame, a load, which is transmitted through an engagement portion between inner teeth of a first gear and outer teeth of a second gear, is concentrated on a collar part of the first gear, which causes deformation of the collar part. The deformation of the collar part causes a deterioration in engagement properties between the second gear and the first gear and causes damage.

However, the present invention provides the structure in which the first coupling portion 251 of the socket 250 is coupled to surround the inner diameter portion of the collar part 212, and the second coupling portion 252 is coupled to surround the outer diameter portion of the collar part 212. Therefore, a load transmitted from the wedge cam 240 may be dispersed by the first coupling portion 251 and the second coupling portion 252, such that a load applied to the collar part 212 may be minimized.

As illustrated in FIG. 10, in the recliner 200 for a vehicle seat of the present invention, a load L, which is applied to the collar part 212 through the engagement portion between the inner teeth 211 of the first gear 210 and the outer teeth 221 of the second gear 220 may be dispersed by the first coupling portion 251 and the second coupling portion 252. Therefore, it is possible to ensure engagement performance of the first gear 210 and the second gear 220.

In the related art, because the collar part, with which the wedge cam is in contact, is manufactured by burring or forming, the outer diameter portion of the collar part is scratched, and non-uniform surface roughness is caused. Further, because the collar part is integrated with the first gear, it is not easy to process the outer diameter portion of the collar part.

However, according to the present invention, the socket 250 having the first and second coupling portions 251 and 252 coupled to the collar part 212 of the first gear 210 is configured separately. Therefore, it is very easy to perform the polishing, such as barreling, on the entirety of the socket 250 or the contact portion of the socket 250, which is in contact with the wedge cam 240, during a subsequent process after the socket 250 is formed by sintering.

The surface roughness of the outer diameter portion of the socket 250 may be optimized, and scratches may be perfectly removed by polishing the outer diameter portion of the socket 212. The contact portion of the socket 250, which comes into contact with the wedge cam 240, may be polished, such that the friction of the wedge cam 240, which operates by being in contact with the socket 250, may be minimized, thereby allowing the wedge cam 240 to operate smoothly.

Next, a process of adjusting an angle of the seatback of the present invention will be described.

As illustrated in FIGS. 9 and 10, the motor (not illustrated) is operated by an operation of a switch (not illustrated), and the shaft (not illustrated) connected to the motor rotates.

The socket 250 connected to the shaft is rotated by the rotation of the shaft. The push portion 255 rotates as the socket 250 rotates. The wedge cam 240 may be rotated by being pushed by the push portion 255. The second gear 220 may be rotated by the rotations of the socket 250 and the wedge cam 240.

The first gear 210 rotates in conjunction with the rotation of the second gear 220. As the first gear 210 rotates, an angle of the seatback frame (not illustrated) may be adjusted, such that an angle of the seatback (not illustrated) may be adjusted in conjunction with the adjustment of the angle of the seatback frame.

The present invention may be applied to a powered recliner configured to be automatically operated by power of a motor in response to a switch manipulation.

As described above, according to the present invention, a load transmitted from the wedge cam may be dispersed by the first and second coupling portions. In addition, according to the present invention, the first coupling portion may serve to define an auxiliary support structure and come into contact with the collar part when the deformation occurs. In addition, according to the present invention, the contact portion of the socket, which comes into contact with the wedge cam, may be polished, thereby minimizing friction of the wedge cam. In addition, the wedge cam may come into contact with and be coupled to the second coupling portion of the socket such that the motion of the wedge cam may be performed at the same time when the shaft is rotated by the operation of the motor.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A recliner for a vehicle seat, the recliner comprising:
a first gear having a collar part at a center thereof, the first gear having inner teeth on an inner diameter portion of the first gear;
a second gear being in contact with an inner surface of the first gear and having outer teeth on an outer diameter portion of the second gear, the second gear being configured to eccentrically engage with the first gear by engaging the outer teeth with the inner teeth;
a socket including a first coupling portion having an outer diameter portion inserted into and coupled to an inner diameter portion of the collar part, and a second coupling portion having an inner diameter portion coupled to surround an outer diameter portion of the collar part while being in contact with the outer diameter portion of the collar part; and
a pair of wedge cams disposed between the socket and the second gear and configured to rotate together with the socket, each wedge cam being configured to restrain the socket and the second gear at a first position between the socket and the second gear when each wedge cam is placed at the first position between the socket and the second gear, each wedge cam being configured to release the socket and the second gear at the first position when each wedge cam is rotated to a second position between the socket and the second gear to restrain the socket and the second gear at the second position,
wherein the first coupling portion and the second coupling portion extend from the socket in a first direction, the first coupling portion and the second coupling portion defining an accommodation groove therebetween, and
wherein the collar part is configured to be inserted into the accommodation groove.

2. The recliner of claim 1, wherein the second coupling portion has a larger circular shape larger than a circular shape of the first coupling portion.

3. The recliner of claim 1, wherein the first coupling portion has extends from the socket in a length longer than a length of the second coupling portion.

4. The recliner of claim 1, wherein a distal end of the second coupling portion is directed toward the first gear.

5. The recliner of claim 1, wherein at least one of the pair of wedge cams is in contact with and coupled to an outer diameter portion of the second coupling portion.

6. The recliner of claim 1, wherein the socket is formed by sintering.

7. The recliner of claim 6, wherein an entirety of the socket or at least a portion of the socket, which comes into contact with at least one of the pair of wedge cams, is polished.

8. The recliner of claim 1, wherein the socket comprises:
a wing portion protruding from a surface of an outer diameter portion of the second coupling portion, a distal end of the wing portion being spaced apart from a distal end of the second coupling portion at an interval;
a push portion extending in a direction from one surface of the wing portion toward the distal end of the second coupling portion; and
an assembling portion protruding from another surface of the wing portion.

9. The recliner of claim 8, wherein the wing portion has a coupling groove, an elastic member is coupled to the assembling portion, and two opposite ends of the elastic member are coupled to insertion grooves defined adjacent to ends of the pair of wedge cams, which face each other, through the coupling groove.

10. The recliner of claim 9, wherein the push portion has an arc shape when viewed from a top of the socket, the push portion has a surface facing each of the pair of wedge cams at an end of the arc shape, and at least one of the pair of wedge cams is configured to be rotated by being pushed by the surface of the push portion.

11. The recliner of claim 8, wherein the socket has an inner diameter portion penetrating a center thereof, and the inner diameter portion has an quadrangular structure, when viewed from a top of the socket, a shaft being capable of being coupled to the inner diameter portion of the socket.

* * * * *